United States Patent [19]
Robinson, Sr.

[11] Patent Number: 5,787,317
[45] Date of Patent: Jul. 28, 1998

[54] SHOULDER CARRIER FOR CAMERA

[76] Inventor: Charles E. Robinson, Sr., 1842 E. 48th Ter., Kansas City, Mo. 64130

[21] Appl. No.: 845,635

[22] Filed: May 1, 1997

[51] Int. Cl.[6] ............................................. G03B 17/00
[52] U.S. Cl. ................................... 396/420; 396/428
[58] Field of Search ............................... 396/419, 420, 396/421, 423, 428; 224/265, 201, 633, 628, 637, 645, 646, 647, 269, 272

[56] References Cited

U.S. PATENT DOCUMENTS

| D. 309,907 | 8/1990 | Herb . | |
|---|---|---|---|
| D. 323,181 | 1/1992 | Puskas et al. . | |
| D. 324,874 | 3/1992 | Kardach . | |
| D. 338,999 | 9/1993 | Desmith . | |
| D. 367,758 | 3/1996 | Pernela . | |
| 2,552,205 | 5/1951 | Moss | 396/420 |
| 2,603,134 | 7/1952 | Burnam | 396/420 |
| 3,332,593 | 7/1967 | Fauser | 396/420 |
| 3,934,769 | 1/1976 | Carlson, Jr. | 396/420 |
| 4,298,149 | 11/1981 | Gottschalk et al. | 396/420 |
| 4,895,286 | 1/1990 | DeRosa | 396/420 |
| 5,042,763 | 8/1991 | Wong | 396/420 |

OTHER PUBLICATIONS

"Camcorder and Computer Video" magazine coverpage and pp. 37, 105 (Apr. 1997).

*Primary Examiner*—David M. Gray
*Attorney, Agent, or Firm*—Hovey,Williams Timmons & Collins

[57] ABSTRACT

A shoulder carrier for a camera, such as a video camera, is provided which positions the camera with its viewfinder adjacent the viewer's eye without the necessity for additional support. The shoulder carrier includes a shoulder harness including a pair of spaced-apart shoulder supports and at least one securement bar interconnecting the supports, a camera mount including a platform and a camera release, and a coupler interconnecting the platform with the shoulder harness for adjustably orienting the camera mount, and thus a camera carried thereon, relative to the shoulder harness. A belt is provided which connects front and back regions of the shoulder supports and connects across the chest area of the wearer. The belt aids in inhibiting the shoulder support from inadvertently disengaging and falling from the wearer, which would result in damage to the camera, thereby freeing the wearer's hands from holding the camera during use.

4 Claims, 2 Drawing Sheets

SHOULDER CARRIER FOR CAMERA

BACKGROUND OF THE INVENTION

1. Field of the Invention

This invention concerns a shoulder carrier particularly useful for camera's such as movie cameras and video cameras. More particularly, it is concerned with an adjustable harness and camera support useful with a variety of body sizes and which frees the photographer's hands for other tasks.

2. Description of the Prior Art

An emerging consumer electronics industry has not only brought the ability to record sound motion pictures into the financial reach of many consumers, but has also brought the bulk and weight of such equipment down so that cameras can be used even by children or individual's of small stature. The video camera, which records both sound and images on economical cassettes or other magnetic media, has reduced substantially cost of audiovisual filming by eliminating, in large part, the need for expensive acetate film and film processing. As video cameras have become more available and lighter in weight, many individuals have sought ways to make them easier to carry and use.

Because of the bulk and weight of many broadcast quality video cameras, special shoulder mounts have been developed to reduce the photographer's fatigue. Examples of such shoulder rests are shown, for example, in U.S. Des. Pat. Nos. D309,907, D324,874 and D323,181. Another approach to dealing with the weight and bulk of such cameras are harnesses or straps, as shown in U.S. Design Pat. Nos. 338,999 and 367,768. However, none of these designs have the requisite stability for true hands-free operation, coupled with a further ability to support the weight of the camera over a substantial length of time.

There has thus developed a need for camera support which is adjustable for a large range of body sizes, positions the camera with the viewfinder in close relationship to the photographer's eye, provides prolonged weight-bearing capability, frees the photographer's hands for other tasks during use, and yields a stable platform for producing satisfactory audiovisual works in either film or magnetic media such as videocassette format.

SUMMARY OF THE INVENTION

These and other objects have largely been met by the shoulder carrier of the present invention. That is to say, the shoulder carrier hereof is stable, properly positions a consumer-sized camera with the eyepiece in proximity to the photographer, is adjustable for a range of body sizes, is stable in use, permits substantially hands-free operation, and in addition is lightweight and comfortable to wear.

The shoulder carrier hereof includes a substantially rigid harness designed for positioning on the photographer's shoulders, a belt which is sized to wrap around the photographer's chest, and a camera support. Preferably, the camera support is adjustable to position the camera coupled thereto at a selected elevation relative to the harness.

In greater detail, the harness is preferably provided with a pair of flexible shoulder supports which may be bent into various configurations to substantially conform to the wearer's shoulders. The supports may be perforated at their ends to permit adjustable connection to respective front and back securement bars. The securement bars position the arcuate shoulder supports at the desired location and amount of separation on the shoulders, and are provided with a plurality of openings to permit attachment in any one of a number of different desired spacings.

BRIEF DESCRIPTION OF THE DRAWINGS

FIG. 1 is a side elevational view of a shoulder carrier for a camera, showing the user and camera in phantom lines to depict the environment of use, and illustrating the;

DESCRIPTION OF THE PREFERRED EMBODIMENT

Figure 1:
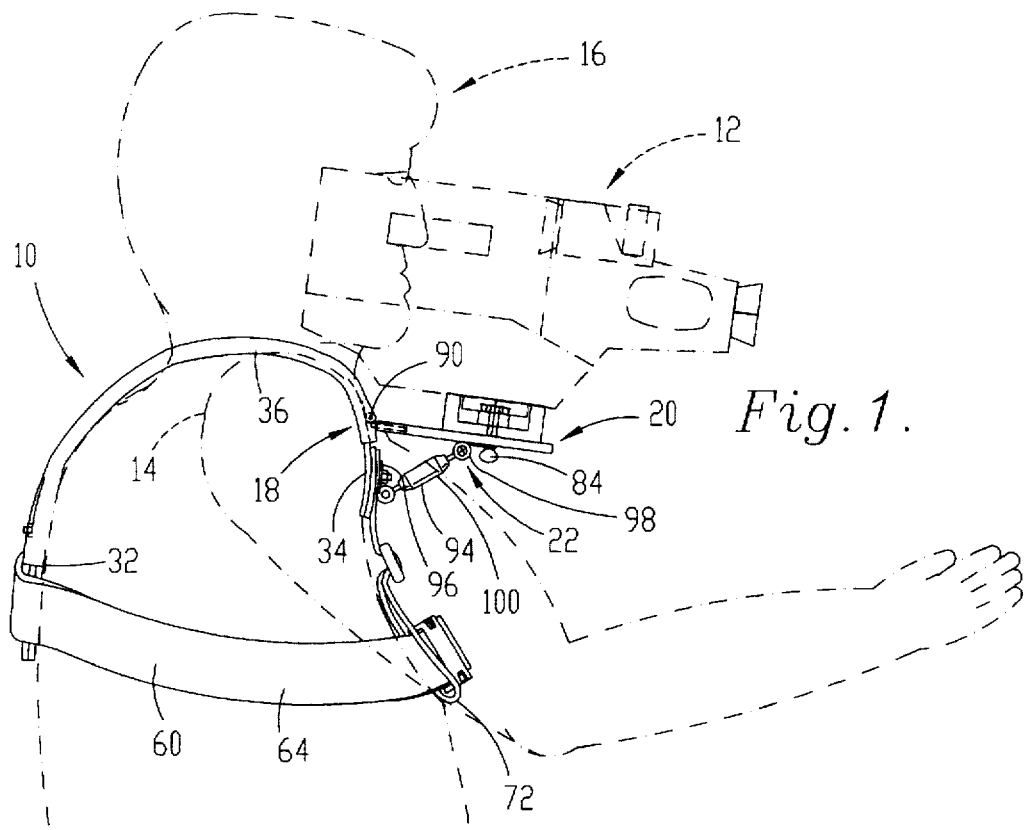
Figure 2:
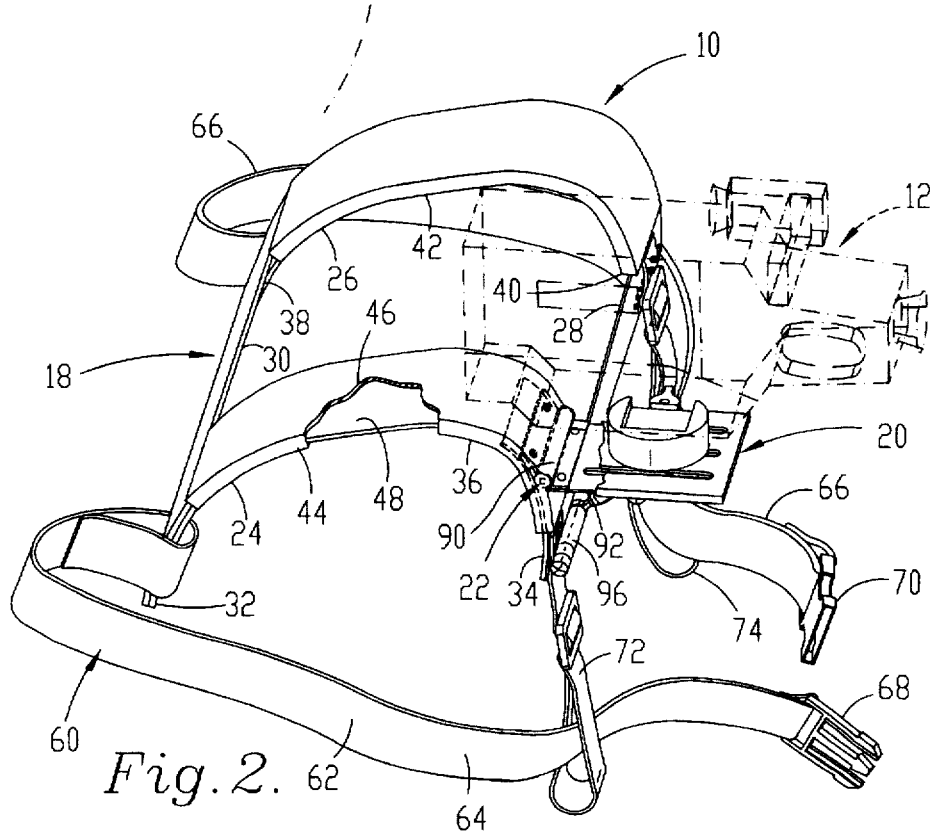
FIG. 2 is a perspective view of the shoulder carrier of FIG. 1, with a portion of the padding of the shoulder support broken away to show the underlying brace.

Referring now to the drawing and in particular FIG. 1, a shoulder carrier 10 is provided for supporting a camera, such as a video camera 12 on the shoulders 14 of a wearer 16. The shoulder carrier 10 broadly includes a shoulder harness 18, a camera mount 20, and a coupler 22 which connects the camera mount to the shoulder harness for hands-free operation.

In greater detail, the shoulder harness 18 includes a first shoulder support 24 and a second shoulder support 26 interconnected in spaced-apart, parallel relationship by a front securement bar 28 and a rear securement bar 30. Both the first shoulder support 24 and second shoulder support 26 are arcuate in configuration, presenting a substantially inverted U-shape in the orientation of typical use. First shoulder support 24 presents a back region 32 configured to engage the back of the wearer 16, a front region 34 configured to engage the chest of the wearer, and an intermediate connecting section 36 adapted to rest on the shoulder of the wearer. Second shoulder support 26 is similarly configured, presenting a back region 38 configured to engage the back of the wearer 16, a front region 40 configured to engage the chest of the wearer, and an intermediate connecting section 42 adapted to rest on the other shoulder of the wearer. Each of the shoulder supports 24 and 26 presents an underside 44 provided with padding 46 of foam rubber, quilted material, or other fabric or synthetic resin. A rib 48 is positioned over the padding 46 in use, the rib 48 being provided of deformable material which remains substantially rigid when bent into a desired configuration. A suitable material for rib 48 is a thin sheet of aluminum, but it may be appreciated that other metals, synthetic resins or deformable materials could also be used, and that, while less desirable, more rigid materials such as wood could also be used. The advantage of using deformable materials which are substantially rigid as set forth above is that the shoulder support may be bent or otherwise conform to the particular shape of the wearer without losing their supporting capabilities.

Figure 4:
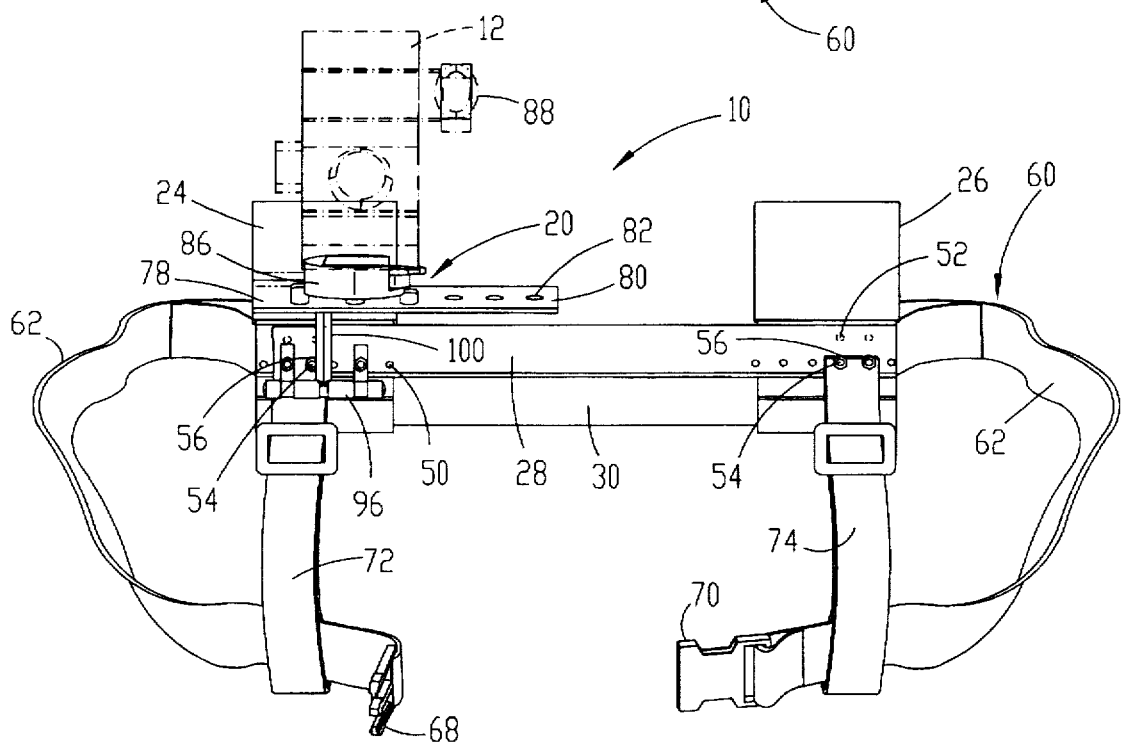
FIG. 4 is a front elevational view thereof, showing the adjustment holes on the front securement bar for varying both the distance between the shoulder supports and the height of the front adjustment bar relative to the shoulder supports, with the hinge for the platform hidden by covering material.

The shoulder supports 24 and 26 are positioned in substantially parallel, vertical orientation by front securement bar 30. The front securement bar 28 is provided with a multiplicity of substantially horizontally aligned, spaced-apart holes 50 for alignment with complementally spaced holes in openings 52 in each of the first and second shoulder supports 24 and 26. At least some of the holes 50 and some of the openings 52 are normally in registry and receive therethrough threaded fasteners 54 such as bolts secured by nuts 56. The nuts may be removed and the threaded fasteners 54 relocated when one or both of the first and second shoulder supports are shifted laterally along front securement bar 28, thereby accommodating wearers 16 of different stature. It may also be seen in FIG. 4 that openings 52 in the first and second shoulder supports 24 and 26 may be offset vertically so that the front securement bar may be shifted vertically for adjustment to accommodate different positioning requirements.

Figure 3:
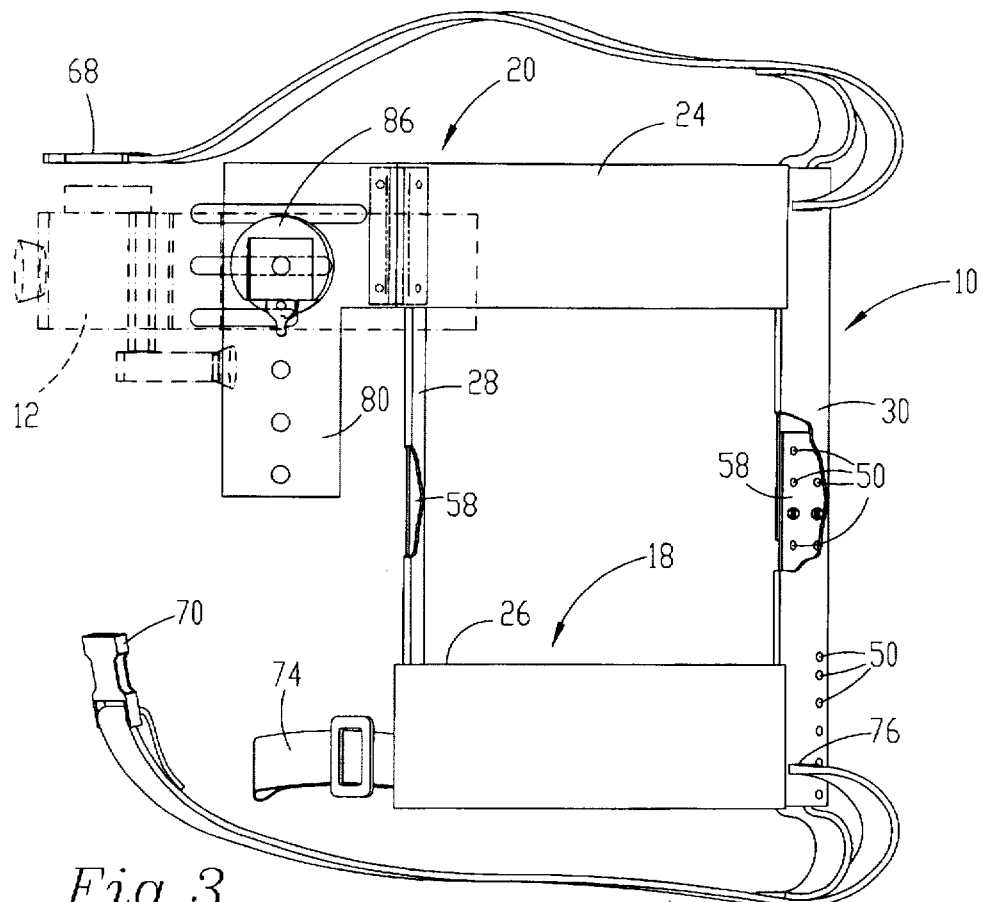
FIG. 3 is a top plan view thereof, with the camera shown in phantom lines, illustrating the platform of the camera mount presenting alternative locating slots for the camera receiver and a portion of the padding of the front and rear securement bars broken away showing the provision for lateral adjustment of the rear securement bars.

As may be seen in FIG. 3, the rear securement bar 30 has overlapping first stay 53a attached to first shoulder support 24 and second stay 53b attached to second shoulder support 26. The first stay 53a and second stay 53b overlap about halfway between first and second shoulder supports 24 and 26 where each is provided with two rows each of a plurality of normally horizontally aligned and spaced holes 55 receiving threaded fasteners 56 therethrough so that the first and second shoulder supports 24 and 26 may be maintained in substantially parallel vertical orientation when adjusted. As may be seen in FIG. 3, the front securement bar 28 includes a substantially rigid thin, preferably metal beam 58 covered by padding 46 which may include a cloth cover, with similar padding 46 provided over stays 53a and 53b of rear securement bar 30.

Also, as may be seen in FIG. 3, a belt 60 is provided for assisting and maintaining the shoulder carrier 10 in position on the shoulders 14 of the wearer 16 during use. The belt 60 is connected to the the back region 32, 38 of each of the first and second shoulder 24, 26 supports and also though the rear securement bar 30. The belt 60 is adapted to pass beneath the arms of the wearer 16 to thereby operatively interconnect the front region to the back region of each of the first and second shoulder supports 24, 26. Belt 60 includes a band 62 of typically nylon webbing divided into a first length 64 and a second length 66, the first length being provided with a clasp 68 for releasably connecting with buckle 70. A first loop 72 is provided to depend from adjacent the front region 34 of the first shoulder support 24 and a second loop 74 is provided to depend from adjacent the front region 40 of second shoulder support 26. The loops 72 and 74 serve to guide and retain the respective first and second lengths of the band 62 in a comfortable wearing position, with the buckle interconnecting the first and second lengths to, in combination with the rear securement bar 30, substantially circumscribe the chest of the wearer 16. As may be seen in FIG. 3, the band 62 passes through slots 76 in registry on each of the rear securement bar and the first and second shoulder supports at the back regions thereof.

Camera mount 20 includes a platform 78 which is generally L-shaped and provided with extension 80 extending from first shoulder support 24 laterally toward second should support 26. The platform is provided with a plurality of fore-and aft extending slots 82 which are laterally spaced across the platform 78. The slots 82 are sized to receive thumbscrew 84 therethrough which may be shifted forwardly or rearwardly along each progressively shorter slot 82a, 82b and 82c to properly position the camera for the individual user. Thumbscrew 84 is threadably connected to camera release 86. The camera release 86 is a quick release coupler adapted to receive a corresponding shoe located on the underside of video camera 12. It may be appreciated that an exemplary camera release 86 is shown, and that other commercially available camera releases 86 may be provided corresponding to the particular model of camera to be used. In some circumstances, the thumbscrew 84 alone will be sufficient when threaded into a complementally threaded recess on the underside of the video camera 12. By removing and relocating thumbscrew 84 in an alternate slot 82, the camera release 86 may be repositioned to locate a view finder 88 of the video camera 12 in an ergonometrically desirable position relative to the viewing eye of the wearer 16.

The coupler 22 preferably permits adjustable positioning of the camera mount 20 to the shoulder harness 18. The coupler 22 includes a hinge 90 interconnecting the front region 34 of first shoulder support with the platform 78. The hinge 90 is shown in phantom in FIGS. 1 and 3 and partially in phantom with also a portion shown with the covering material over the platform 78 broken away. The hinge 90 and may be attached by rivets, sheet metal screws, bolts or the like. When bolts or similar removable fasteners are used to connect the hinge to the first shoulder support 24, alternative vertically spaced holes 52a in the shoulder support 24 may permit vertical repositioning of the hinge and thus the platform 78 to adapt to an individual wearer 16. In addition, a brace 92 adjustably maintains the desired orientation of the camera mount 20 to the shoulder harness 18. The brace 92 includes a turnbuckle 94 which is pivotably connected to first hinge bracket 96 attached to front region 34 beneath hinge 90, and to second hinge bracket 98 attached to the underside of the platform 78 rearwardly of the holes 82 receiving thumbscrew 82. By rotating turnbuckle body 100, the camera mount 20 may be pivoted on hinge 90 relative to shoulder harness 18.

In use, the wearer 16 places the shoulder carrier on his or her shoulders with his neck located between first shoulder support 24 and second shoulder support 26. The wearer's arms are then passed over the band 62 and the buckle secured across his chest. The camera is then mounted to the camera release 86. With the camera 12 thus in position, the wearer can adjust the turnbuckle to pivot the platform 78 so that the camera 12 has the desired field of view. With the camera properly positioned, the wearer may begin filming. If desired, the camera may be locked in the filming mode, whereby the wearer's hands may be freed from the necessity of holding the camera until filming is to be discontinued. This substantially reduces fatigue on the wearer, as the weight of the camera remains borne entirely by the wearer's shoulders 14 rather than his or her arms.

As noted above, the ribs 48 may be deformed so that the shoulder supports are in close conformance with the body of the wearer. The belt 60 aids in maintaining the shoulder supports in close contact. Yet further, the front securement bar 30 may be detached from the shoulder supports 24, 26 and repositioned and reattached so that the spacing between the shoulder supports may be varied to accommodate the body of the individual wearer 16. As demonstrated by the additional holes 52 visible in FIGS. 3 and 4, the securement bars may also be vertically repositioned on the shoulder supports 24 and 26 to accommodate the body size of the wearer 16. Further, the hinge 90 may be adjustably positioned in alternative holes 52a to properly position a desired camera. The camera release 86 may be laterally positioned in any one of the desired slots 82 by repositioning thumbscrew 84, and may be moved toward or away from the user's head by loosening the thumbscrew 84, moving the camera and camera release 86 by sliding the thumbscrew along the slot 82, and then retightening the thumbscrew. Finally, the angle of elevation of the platform 78 and thus the camera carried thereon may be adjusted by turning the turnbuckle body 100 to pivot the platform about the hinge 90.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:

1. A shoulder carrier for a camera comprising:

first and second shoulder supports each presenting a front side and a rear side;

a first bar for positioning the front side of said first and second shoulder supports in fixed spaced-apart relationship;

a second bar for positioning the rear side of said first and second shoulder supports in fixed spaced-apart relationship;

first connecting means adjustably coupling said first bar to said front side of said first and second shoulder supports for selectively varying the relative spacing between said first and second shoulder supports;

adjustment means associated with said second bar for selectively varying the relative spacing between said first and second shoulder supports;

a platform for supporting a camera;

a camera mount for coupling a camera to the platform; and a coupler including a hinge mounted on one of said shoulder supports and a brace for pivotally connecting said platform to one of said first and second shoulder supports and adjustably supporting said platform at a desired orientation relative to said one of said first and second shoulder supports.

2. In a shoulder carrier for a camera comprising first and second laterally spaced shoulder supports, a bar connecting said first and second shoulder supports in fixed spaced-apart relationship, the improvement comprising a platform presenting a plurality of longitudinally oriented, spaced apart parallel slots, a hinge pivotally coupling said platform to one of said first and second shoulder supports for movement about an axis transverse to said slots, an adjustable brace for adjustably supporting said platform in a desired angular orientation relative to said one of said shoulder supports, and a camera mount slidably coupled to said platform in one of said slots for adjustable positioning along said one of said slots.

3. A shoulder carrier as set forth in claim 2, wherein said plurality of slots include a first slot having a length which is greater than the length of a second, adjacent slot.

4. A shoulder carrier as set forth in claim 2, wherein said brace includes a turnbuckle.

* * * * *